(12) United States Patent
Smith et al.

(10) Patent No.: US 7,322,593 B2
(45) Date of Patent: Jan. 29, 2008

(54) RUNNING BOARD FOR VEHICLE HAVING CLASS A FINISH

(75) Inventors: Leslie E. Smith, Lapeer, MI (US); Vincent B. Rocheleau, Metamora, MI (US); John C. Montagna, Metamora, MI (US); Thomas G. Sierakowski, Metamora, MI (US)

(73) Assignee: Durakon Industries, Inc., Lapeer, MI (US)

( * ) Notice: Subject to any disclaimer, the term of this patent is extended or adjusted under 35 U.S.C. 154(b) by 14 days.

(21) Appl. No.: 10/700,887

(22) Filed: Nov. 4, 2003

(65) Prior Publication Data

US 2005/0093266 A1 May 5, 2005

(51) Int. Cl.
*B60R 3/00* (2006.01)
(52) U.S. Cl. ...................... 280/163; 280/169
(58) Field of Classification Search ............... 280/163, 280/169, 851; 428/35.7, 156, 168
See application file for complete search history.

(56) References Cited

U.S. PATENT DOCUMENTS

| | | | |
|---|---|---|---|
| 5,286,049 A | 2/1994 | Khan | |
| D400,149 S | 10/1998 | Zentner | |
| D400,150 S | 10/1998 | Zentner | |
| D400,151 S | 10/1998 | Zentner | |
| D400,152 S | 10/1998 | Zentner | |
| D400,485 S | 11/1998 | Zentner | |
| D400,486 S | 11/1998 | Zentner | |
| 6,050,579 A * | 4/2000 | Selland et al. | 280/163 |
| 6,440,524 B2 * | 8/2002 | Valyi et al. | 428/99 |
| 6,513,821 B1 | 2/2003 | Heil | |
| 2003/0003828 A1* | 1/2003 | Ellison et al. | 442/268 |
| 2003/0006576 A1* | 1/2003 | Lanoue et al. | 280/163 |
| 2003/0184039 A1* | 10/2003 | Schumacher | 280/163 |

OTHER PUBLICATIONS

International Search Report in Counterpart PCT/US2004/032608 (Jul. 7, 2005) 4 Pages.

* cited by examiner

*Primary Examiner*—Christopher P. Ellis
*Assistant Examiner*—John D Walters
(74) *Attorney, Agent, or Firm*—Flaster/Greenberg P.C.

(57) ABSTRACT

A running board for a passenger car or light truck is assembled from an upper molded thermoplastic section or component having a Class A automotive finish and a lower component or section having reinforcing ribs and mounting brackets. The upper section includes three layers: a paint film having a Class A automotive finish, a thin layer of thermoplastic polyolefin (TPO) and a thick layer of polypropylene. The lower section is homogeneous and may be a plastic such as TPO, polypropylene or high-density polyethylene (HDPE), for example, which may contain chopped, randomly oriented glass reinforcing fibers. The two sections are secured to one another about their peripheries by autogenous bonding.

18 Claims, 4 Drawing Sheets

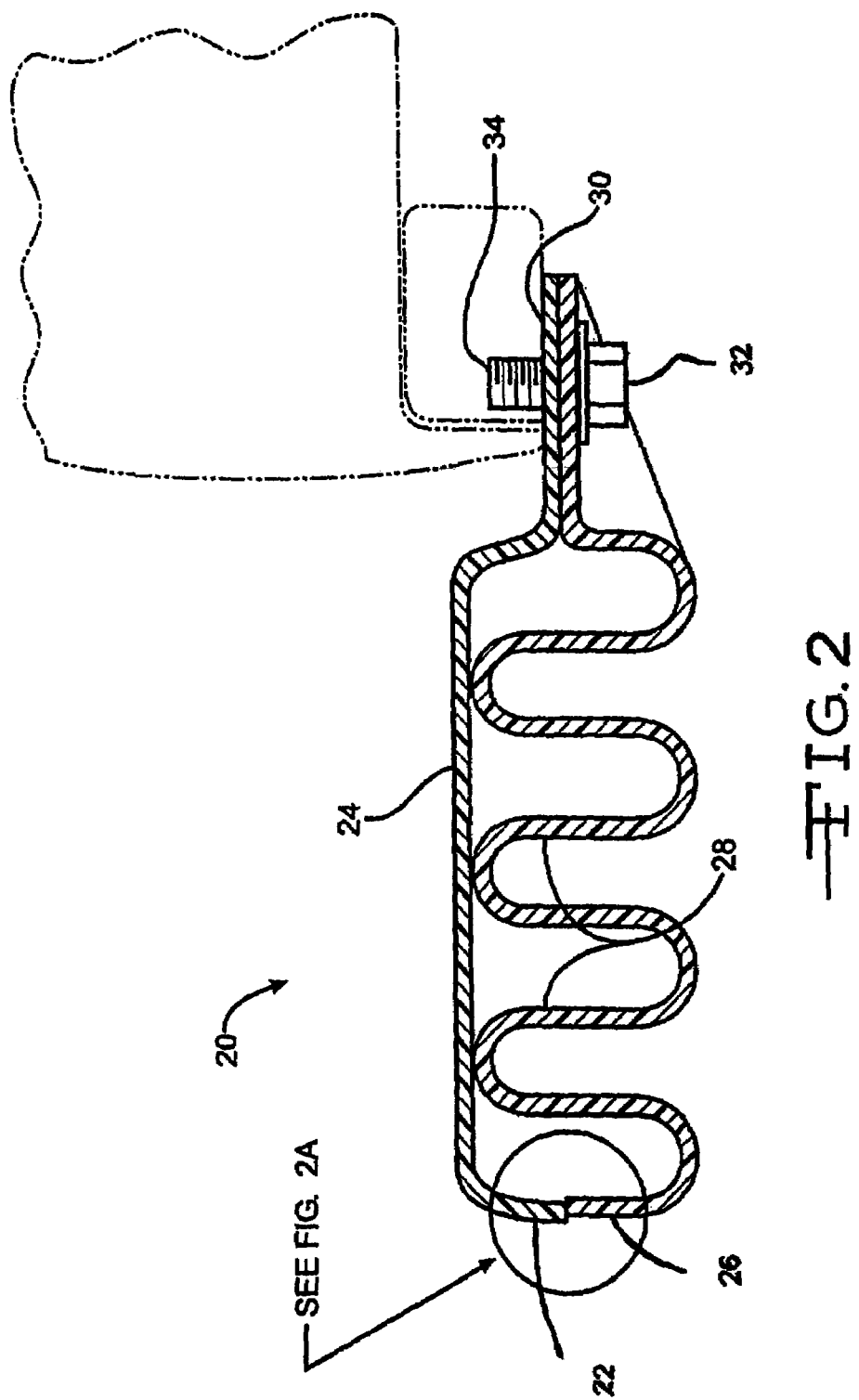

RUNNING BOARD FOR VEHICLE HAVING CLASS A FINISH

BACKGROUND OF THE INVENTION

The invention relates generally to molded, thermoplastic articles, and more specifically to a molded, running board for a motor vehicle of thermoplastic material having a Class A automotive finish on its upper surface.

The light truck and automotive industry is faced with the continuing challenge of improving, i.e., reducing, fuel consumption. CAFÉ fuel consumption standards were imposed many years ago on passenger vehicles. The possibility now exists that similar standards will be imposed upon light trucks and SUVs. Notwithstanding government mandates, the automotive and truck industries continue to focus upon engineering solutions which improve, i.e., reduce, fuel consumption. The two foci of this goal have been improved engine operation and reduced vehicle weight.

With regard to reduced vehicle weight, unfortunately, another trend has overtaken the automotive and light truck industry: increased vehicle content. The highly optioned contemporary vehicle typically carries with it several hundred pounds of accessory equipment that was either rare or non-existent a generation ago. Given these consumer demands, the automotive and light truck industry has responded by attempting to reduce the weight not only of the vehicle but also of these accessories.

A class of accessories which represents significant additional vehicle weight includes such items as accessory bumpers, tonneau covers for pick-up trucks, and running boards. The opportunity to replace such components, frequently fabricated of metal, with light-weight, high-strength plastics has obvious benefits such as weight reduction and elimination of rusting and accompanying deterioration. The present invention is directed to such a product.

BRIEF SUMMARY OF THE INVENTION

A running board for a passenger car or light truck is assembled from an upper molded thermoplastic section or component having a Class A automotive finish and a lower component or section having reinforcing ribs and mounting brackets. The upper section includes three layers: a paint film having a Class A automotive finish, a thin layer of thermoplastic polyolefin (TPO) and a thick layer of polypropylene. The lower section includes reinforcing ribs or convolutions, is homogeneous and may be a plastic such as TPO, polypropylene or high-density polyethylene (HDPE), for example, which may contain chopped, randomly oriented glass reinforcing fibers. The two sections are secured to one another about their peripheries by autogenous bonding. Optionally, the interior spaces between the ribs may be filled with cured-in-place plastic foam.

Thus it is an object of the present invention to provide a running board for a motor vehicle or passenger car having an upper surface with a Class A automotive finish.

It is a further object of the present invention to provide a running board fabricated entirely of molded thermoplastic material.

It is a still further object of the present invention to provide a motor vehicle running board fabricated of a thermoplastic material reinforced with glass fibers.

It is a still further object of the present invention to provide a motor vehicle running board having a ribbed, reinforcing lower section.

It is a still further object of the present invention to provide a foam-filled, ribbed, reinforcing section.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 2 is a full, sectional view of a motor vehicle running board according to the present invention taken along line 2-2 of FIG. 1;

DETAILED DESCRIPTION OF THE PREFERRED EMBODIMENT

Figure 1:
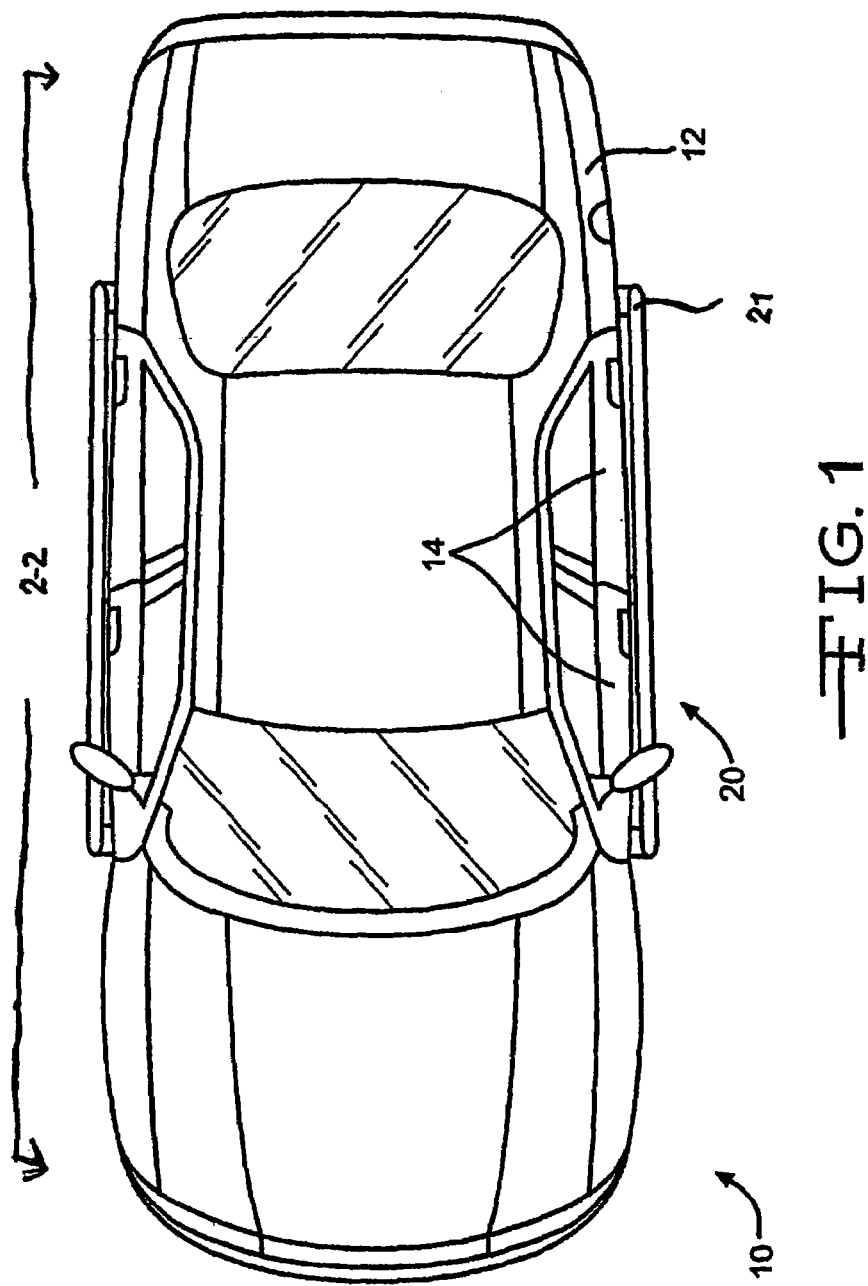
FIG. 1 is a plan view of a motor vehicle having running boards according to the present invention attached thereto.

Referring now to FIGS. 1 and 2, a motor vehicle, typically a passenger car to which the present invention is attached is illustrated and generally designated by the reference number 10. The passenger car 10 is conventional and includes a body 12 having doors 14. It should be readily understood that the present invention may be utilized as well with a pick-up truck, a light truck, a sport utility vehicle (SUV), a delivery van, a station wagon or a crossover vehicle (all not illustrated). A pair of running boards 20 are disposed at the lower portion of vehicle body 12 and secured thereto or to the vehicle body 12 or frame 21.

Figure 2A:
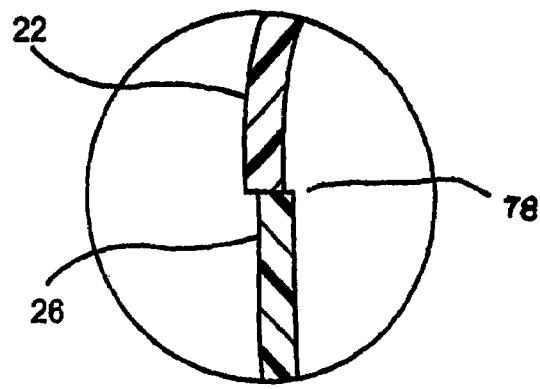
FIG. 2A is a greatly enlarged view of the juncture between the upper and lower sections of a motor vehicle running board according to the present invention.
Figure 3:
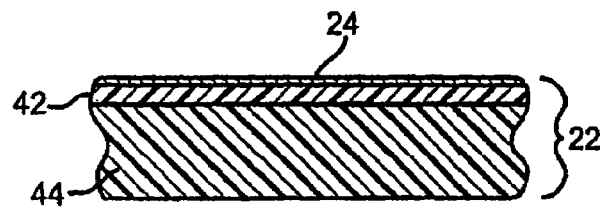
FIG. 3 is an enlarged, fragmentary, sectional view of the layers of the upper component or section of a motor vehicle running board according to the present invention.

Referring now to FIGS. 2A and 3, the running board 20 defines an elongate, first or upper section or component 22 having a planar upper surface 24 defining a painted Class A automotive surface. The running board 20 also defines an elongate, second or lower component or section 26 substantially co-extensive with the upper section or component 22 which defines a plurality of convolutions or ribs 28. The elongate lower section 26 also includes a plurality of spaced apart transversely and unidirectionally extending lugs or mounting brackets 30. Preferably three mounting brackets 30 are spaced along the length of the running board 20 although more or fewer may be included and utilized depending upon the length of the running board 20, anticipated loads and other design and engineering considerations. Each of the mounting brackets 30 defines one or more through apertures 32 for receiving a threaded fastener such as a bolt 34 or other preferably removable mounting device for securing the running board 20 to the body or frame 21 of the vehicle 10, as noted above.

As illustrated in FIGS. 1-2 and 3, the elongate upper section or component 22 of the running board 20 includes an upper thin layer of a paint film 24 which provides a Class A automotive finish to the running board 20. The second layer of the upper section 22 is a relatively thin layer 24 of the thermoplastic polyolefin (TPO). The thermoplastic polyolefin layer 42 is an adhesive or tie layer arid is a uniform, homogenous material capable of being formed into a layer having high surface uniformity which provides the necessary smoothness and uniformity to support the paint film 24 and achieve the Class A automotive finish. The tie layer of thermoplastic olefin 42 is compatible with the paint film 24 and a substrate layer 44. The substrate layer 44 which is significantly thicker than the other layers and is preferably polypropylene or a similar thermoplastic material. The substrate layer 44 preferably includes chopped, randomly oriented glass fibers or other reinforcing fibers such as carbon fibers which create a plastic/fiber matrix. The substrate layer 44 provides significant strength and rigidity to the elongate upper section 22 and overall to the running board 20, illustrated in FIG. 2.

Alternatively, the upper thin paint film layer 24 may include a thin mask layer of a polyolefin or similar polymer which covers and protects the paint film layer such as a multilayer fluropolymer. As a further alternative, a polyolefin or similar polymer mask layer may cover and protect a clear coat such as an ionomer which in turn protects and fully covers a pigmented ionomer layer. Alternatively as well, the substrate or base layer 44 may be of two layers and include a pigmented thermoplastic olefin (TPO) upper or cap layer which is pigmented to match the color of the thin layer of paint film 24 to improve its appearance and may also include a lower reinforcing layer which includes the chopped fibers as noted above.

As illustrated in FIG. 2, the second or lower section 26 and its convolutions 28 are preferably fabricated of TPO, polypropylene or HDPE. This plastic may also be reinforced with glass fibers, carbon fibers or other fibrous material having a high length to cross-sectional area ratio to form a plastic/fiber matrix.

Figure 4:
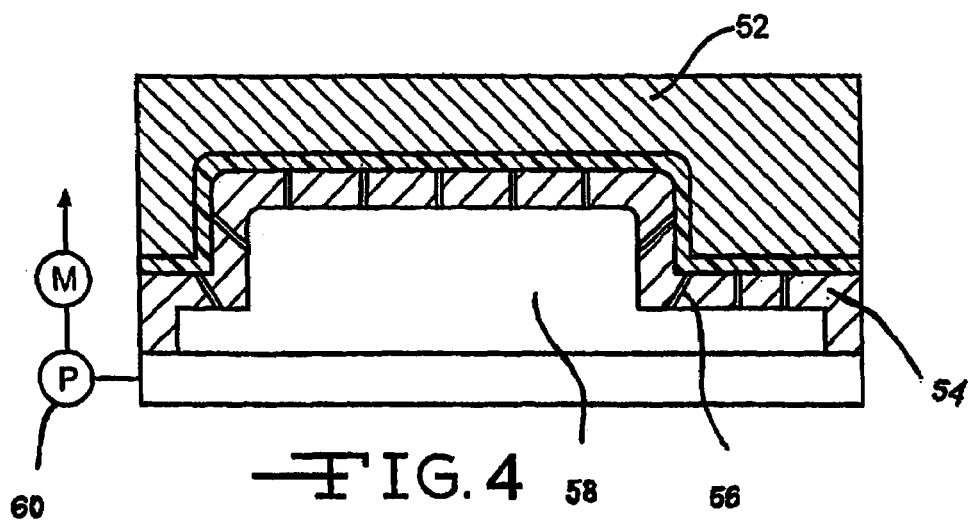
FIG. 4 is a diagrammatic, sectional view of a two-piece mold for fabricating the upper component or section of a motor vehicle running board according to the present invention.
Figure 5:
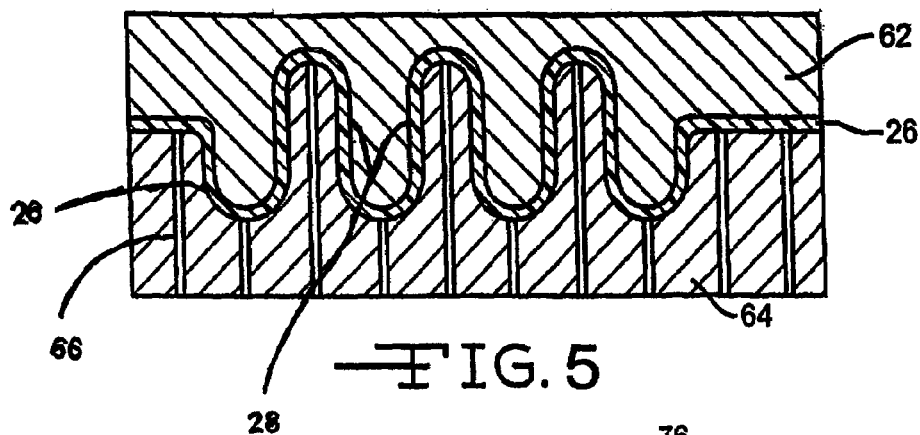
FIG. 5 is a diagrammatic, sectional view of a two-piece mold for fabricating the lower component or section of a motor vehicle running board according to the present invention.
Figure 6:
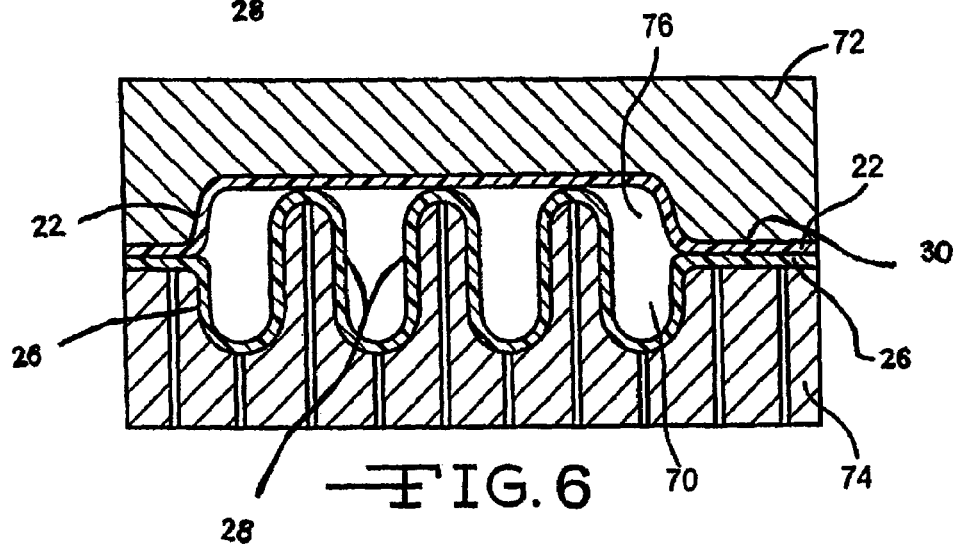
FIG. 6 is a diagrammatic, sectional view of a two-piece mold for assembling a motor vehicle running board according to the present invention.

Manufacture of the running board 20 according to the present invention will now be explained with reference to FIGS. 4, 5 and 6 illustrate the manufacture of the running board 20, illustrated in FIG. 2. With regard to the elongate upper section 22, the three layers illustrated in FIG. 3 are preferably co-extruded through conventional extruding techniques. In FIG. 4 an elongate piece of the co-extruded three-layer material1 illustrated in FIG. 3, is placed within a mold having a female or upper mold section 52 and a male or lower mold section 54. Preferably, the lower mold section 54 includes vacuum ports 56 which communicate with a plenum 58 which is maintained at a partial vacuum by a vacuum pump 60. The three layer material is thus molded into the transverse and longitudinal profile of the upper section 22 of the running board 20. When fully formed and at least partially cooled, the mold sections 52 and 54 are separated, and the upper section 22 is removed.

As illustrated in FIG. 5, an upper, mold section 62 and a lower, mold section 64 are utilized to thermoform the elongate lower section 26 of the running board 20, illustrated in FIG. 2, including the convolutions or ribs 28, and the lugs or mounting brackets 30, illustrated in FIG. 2. Again, vacuum ports 66 may be utilized in conjunction with the plenum 58, illustrated in FIG. 5 and vacuum pump, (not illustrated) to facilitate molding of the elongate lower section 26. When fully formed and at least partially cooled, the upper mold segment 62 and the lower mold segment 64 are separated1 and the lower section or component 26 is removed.

Figure 7:
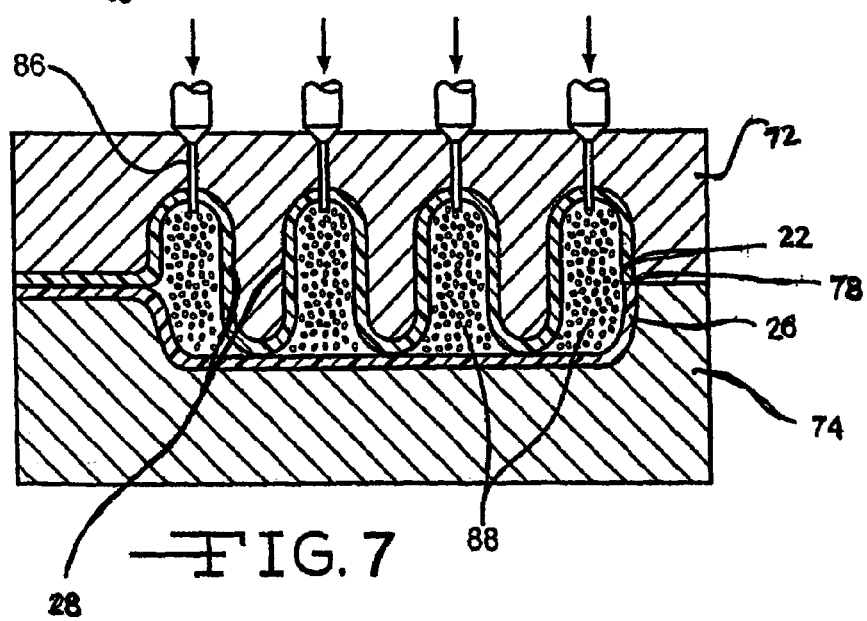
FIG. 7 is a diagrammatic, sectional view of a two-piece mold wherein a reinforcing foam is disposed within the interior of a motor vehicle running board according to the present invention by a plurality of injection devices.

With reference to FIG. 6, a female or upper mold section 72 and a male or lower mold section 74 having mold cavity portions 76 and 70, respectively, corresponding to the finished running board 20, including the rib 28 and mounting bracket 30, are utilized. The elongate upper section 22 and the elongate lower section 26 are both preheated and placed within the appropriate mold segments 72 and 74, and the mold is closed, securing the sections 22 and 26 by autogenous bonding about their peripheries. FIG. 2A illustrates an offset or overbite 78, built into the mold sections 72 and 74. This intentional offset 78, wherein the upper section 22 slightly overhangs the lower section 26, improves the appearance of the running board 20, illustrated in FIG. 1, and ensures that even if the lower mold section 74 moves slightly out of position, to the left, as shown in FIG. 7, the resulting parting line will still be an overbite, and thus be less visible than the opposite condition.

The foregoing completes manufacture of the running board 20, illustrated in FIG. 2. As illustrated in FIG. 7, however, it may be desirable to fill the interior or voids within the running board 20, illustrated in FIG. 2, with, for example, a self-curing, two component foam. Accordingly, extendable and retractable needles 86 may be utilized to pierce the elongate lower section 26 in the terminal portions of the ribs 28 in regions which will not be visible to the user of the running board 20, illustrated in FIG. 20, to inject a self-curing foam 88 into the interior of the running board 20. Such self-curing foam 88 increases the rigidity and strength of the running board as will be readily appreciated.

The foregoing disclosure is the best mode devised by the inventors for practicing this invention. It is apparent, however, that products and methods incorporating modifications and variations will be obvious to one skilled in the art of molded thermoplastic vehicle components. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A running board for a motor vehicle comprising
    (a) an upper elongate section having an upper paint layer, an intermediate layer of a thermoplastic material having a smooth upper surface for receiving the paint layer, and a lower substrate layer for supporting the intermediate layer,
    (b) a lower elongate section defining a plurality of reinforcing convolutions and at least two transversely extending mounting lugs,
    (c) the upper and the lower elongate sections being directly joined together along an edge by autogenous bonding, wherein the upper section has ends extending from the autogenously bonded edge which partially overhangs the lower section in a lateral transverse configuration to define a lip by the upper section.

2. The running board of claim 1, wherein the paint layer provides a Class A automotive finish.

3. The running board of claim 1, wherein the reinforcing convolutions extend longitudinally along the lower elongate section.

4. The running board of claim 1, further comprising plastic reinforcing foam disposed between the upper and the lower elongate sections.

5. The running board of claim 1, wherein the thermoplastic material of the upper elongate section comprises reinforcing glass fibers.

6. The running board of claim 1, comprising three transversely extending mounting lugs.

7. The running board of claim 1, wherein the transversely extending mounting lugs comprise through openings adapted to receive fasteners.

8. A running board for a motor vehicle comprising
   (a) a first elongate section having a first paint layer, an intermediate layer of a thermoplastic material having a smooth first surface for receiving the paint layer, and a substrate layer for supporting the intermediate layer,
   (b) a second elongate section defining a plurality of longitudinally extending reinforcing convolutions and at least two transversely extending mounting lugs,
   (c) the first and the second elongate sections are joined directly together along an edge by autogenous bonding, wherein the first section has ends extending from the autogenously bonded edge which partially overhangs the second section in a lateral transverse configuration to define a lip by the first section.

9. The running board of claim 8, wherein the paint layer provides a Class A automotive finish.

10. The running board of claim 8, further comprising plastic reinforcing foam disposed between the upper and the lower elongate sections.

11. The running board of claim 8, wherein the thermoplastic material of the upper elongate section comprises reinforcing glass fibers.

12. The running board of claim 8, comprising three transversely extending mounting lugs.

13. The running board of claim 8, wherein the transversely extending mounting lugs comprise through openings adapted to receive fasteners.

14. A method of manufacturing a running board for a motor vehicle, comprising
   (a) providing a first co-extruded panel of material having an upper paint layer, an intermediate layer of a thermoplastic material, and a substrate layer,
   (b) forming the first co-extruded panel of material in a thermoforming mold into an elongate upper section of a running board,
   (c) providing a second panel of thermoformable material,
   (d) forming the second panel of thermoformable material into an elongate lower section having a plurality of reinforcing ribs and at least two transversely extending mounting brackets,
   (e) placing the first thermoformed panel and the second thermoformed panel into a mold,
   (f) autogenously bonding the first panel directly to the second panel about their common peripheries wherein the first panel and second panel have extending ends, wherein the extending ends of the first panal and the ends of the second panal are aligned at the position of the autogenous bond and forming an a lateral transverse partially overhanging lip on an edge of the first panel opposite the mounting brackets on the second panel.

15. The method of claim 14, wherein the upper paint layer provides a Class A automotive finish.

16. The method of claim 14, wherein the lower substrate layer of the upper elongate section comprises glass reinforcing fibers.

17. The method of claim 14, wherein the reinforcing ribs of the lower elongate section extend longitudinally along the section.

18. The method of claim 14, further comprising the step of filling an interior of the running board with foam.

\* \* \* \* \*